United States Patent
Zhao et al.

(10) Patent No.: US 10,789,751 B2
(45) Date of Patent: Sep. 29, 2020

(54) METHOD AND APPARATUS FOR IMPLEMENTING ANIMATION IN CLIENT APPLICATION AND ANIMATION SCRIPT FRAMEWORK

(71) Applicant: Alibaba Group Holding Limited, Grand Cayman (KY)

(72) Inventors: Kun Zhao, Hangzhou (CN); Xing Li, Hangzhou (CN); Shunjian Ni, Hangzhou (CN); Jinpeng Yang, Hangzhou (CN); Man Yang, Hangzhou (CN); Chenqwen Wang, Hangzhou (CN); Zhifei Bao, Hangzhou (CN); Kunlun Zhao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/228,598

(22) Filed: Dec. 20, 2018

(65) Prior Publication Data

US 2019/0197754 A1 Jun. 27, 2019

(30) Foreign Application Priority Data

Dec. 25, 2017 (CN) .......................... 2017 1 1423001

(51) Int. Cl.
*G06T 13/00* (2011.01)
(52) U.S. Cl.
CPC .......... *G06T 13/00* (2013.01); *G06T 2213/04* (2013.01); *G06T 2213/08* (2013.01)

(58) Field of Classification Search
CPC .. G06T 13/00; G06T 2213/04; G06T 2213/08
USPC ........................................................ 345/473
See application file for complete search history.

(56) References Cited

U.S. PATENT DOCUMENTS

| 5,867,175 | A  | * | 2/1999 | Katzenberger | .......... G06T 13/00 |
| | | | | | 345/473 |
| 10,334,328 | B1 | * | 6/2019 | Rosen | ..................... G06N 20/00 |
| 2004/0027352 | A1 | * | 2/2004 | Minakuchi | .............. G06T 13/40 |
| | | | | | 345/473 |
| 2004/0233201 | A1 | * | 11/2004 | Calkins | ................... G06T 13/00 |
| | | | | | 345/473 |

(Continued)

*Primary Examiner* — Jin Ge
(74) *Attorney, Agent, or Firm* — Lee & Hayes, P.C.

(57) ABSTRACT

A method for implementing animation in a client application, includes receiving an animation code written in a script language from a server, the animation code including a logic script and an animation description script; parsing the logic script in the animation code, and obtaining a view identifier, an animation identifier, and a pre-obtained correspondence relationship between the view identifier and the animation identifier included therein; determining a view component to be driven and corresponding to the view identifier in a client application based on a correspondence relationship between view identifiers and view components, and reading an animation description to be implemented and corresponding to the animation identifier in the animation description script according to the animation identifier corresponding to the view identifier; and determining that loading of the animation description to be implemented in the view component to be driven according to a condition provided by the logic script.

20 Claims, 4 Drawing Sheets

(56) References Cited

U.S. PATENT DOCUMENTS

| | | | |
|---|---|---|---|
| 2010/0097384 A1* | 4/2010 | Jung | G06Q 50/184 |
| | | | 345/473 |
| 2012/0236007 A1* | 9/2012 | Kuroda | G06T 13/00 |
| | | | 345/473 |
| 2016/0027198 A1* | 1/2016 | Terry | G06F 16/00 |
| | | | 345/473 |
| 2018/0300958 A1* | 10/2018 | Schriber | G06T 19/20 |

* cited by examiner

METHOD AND APPARATUS FOR IMPLEMENTING ANIMATION IN CLIENT APPLICATION AND ANIMATION SCRIPT FRAMEWORK

CROSS REFERENCE TO RELATED PATENT APPLICATIONS

This application claims priority to Chinese Patent Application No. 201711423001.7, filed on 25 Dec. 2017, entitled "Method and Apparatus for Implementing Animation in Client Application and Animation Script Framework," which are hereby incorporated by reference in their entirety.

TECHNICAL FIELD

The present disclosure relates to the field of computer technologies, and in particular, to methods and apparatuses for implementing animation in a client application. The invention also relates to a framework for implementing an animation script in a client application, and an electronic device.

BACKGROUND

With the rapid development of the Internet, more and more users are participating in online shopping. In order to attract the attention of users, all major e-commerce companies add animation effects to client-side graphical interfaces.

In existing technologies, animation effects of an application program of a client are implemented by means of hard coding of the client. An entire process from an animation requirement to the landing includes proposing a requirement, designing an animation effect, developing the animation effect, compiling a package, submitting an entire application program to be tested by a test engineer (the entire application program needs to be retested in order to be released because of changes to codes of the application program), submitting to an application market for review, and updating the application program of a client by a user.

Schemes for animating a client application program provided by the existing technologies have some drawbacks:

1. Implementation of an animation needs to be hard-coded in advance, and cannot be temporarily adjusted and changed after release.

2. Adjustment or addition of new animation effects needs to go through processes such as development, compilation, packaging, testing, and release, etc. An entire process thereof is cumbersome, and the time consumed for a cycle is relatively long. A new client version requires a period of time of user updates to achieve a certain proportion. Animation effects cannot be fully covered, and users can't experience new features instantly.

3. Generally, operators want to attract users' attention through animation effects to increase operational effects, and hope to for quick trial and error with changes of operational needs, in order to demand the best operational results. However, due to the high cost and long cycle of animations of client applications, operational requirements cannot be met.

In summary, existing methods for implementing animation in a client application have problems of inability of temporary adjustment and changes, having a low coverage, and failure in satisfying operational requirements.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present disclosure provides a method for implementing animation in a client application to solve problems of existing methods for implementing animation in a client application that are incapable of temporary adjustment and changes, having a low coverage, and failing to satisfy operational requirements. The present disclosure further provides an apparatus for implementing animation in a client application.

A method for implementing animation in a client application provided by the present disclosure includes receiving an animation code written in a script language sent from a server, the animation code including a logic script and an animation description script; parsing the logic script in the animation code, and obtaining a view identifier, an animation identifier, and a correspondence relationship between the view identifier and the animation identifier included therein; determining a view component to be driven that corresponds to the view identifier in a client application based on a pre-obtained correspondence relationship between view identifiers and view components, and reading an animation description to be implemented that corresponds to the animation identifier in the animation description script according to the animation identifier corresponding to the view identifier; and determining that loading of the animation description to be implemented in the view component to be driven according to a condition provided by the logic script.

In implementations, before receiving the animation code written in the script language sent from the server, the method includes receiving configuration data sent from a configuration center; the configuration data including at least configuring whether a configuration of animation processing takes effect, and a name of a script that is receivable by the client application.

In implementations, a logic function of the logic script includes animation triggering, executing, pausing, and recycling.

In implementations, the animation description script is animated in a JSON language.

In implementations, the pre-obtained correspondence relationship between the view identifiers and the view components is obtained synchronously from an application program.

A framework for implementing an animation script in a client application provided by the present disclosure includes an engine module, a configuration module, an adapter module, and a service module.

The engine module is configured to provide initialization of a framework, including implementing registration of an interface of a configuration center and implementing registration of an interface of a template center.

The configuration module is configured to receive configuration data of the configuration center that the framework depends on, the configuration data providing information needed for the framework to access the service module.

The adapter module is configured to provide a universal adaptation interface to different application modules, provide an interface related to an execution of an animation script to the application modules, and provide an animation-driven interface in the application modules.

The service module is configured to provide a running environment of a script language, and receive and load a script program.

In implementations, the configuration data of the configuration center that the framework depends on includes whether an animation processing takes effect and a name of a script that is receivable by the client application.

In implementations, the different application modules include mobile Taobao, mobile Tmall, and Juhuasuan.

In implementations, the framework further includes an animation service module configured to provide an animation parsing function and store parsed animation description data.

In implementations, the framework further includes a template receiving module configured to receive an animation template provided by the template center, wherein the animation template provided by the template center is used when the service module runs the script program.

In implementations, after receiving the loading of the script program, the service module performs the following processing: parsing a logic script in an animation code, obtaining a view identifier, an animation identifier, and a correspondence relationship between the view identifier and the animation identifier included therein; determining a view component that is to be driven and corresponds to the view identifier in the client application based on a pre-acquired correspondence relationship between the view identifier and the view component, and reading an animation description that is to be implemented and corresponds to the animation identifier in an animation description script based on the animation identifier corresponding to the view identifier; and loading the animation description to be implemented into the view component to be driven in the client application through an interface provided by the adapter module based on a condition provided by the logic script when the condition is met.

An apparatus for implementing animation in a client application provided by the present disclosure includes a code receiving unit configured to receive an animation code written in a script language sent from a server, the animation code including a logic script and an animation description script; a script parsing unit configured to parse the logic script in the animation code, and obtain a view identifier, an animation identifier, and a correspondence relationship between the view identifier and the animation identifier included therein; a view and animation determination unit configured to determine a view component that is to be driven and corresponds to the view identifier in a client application based on a pre-obtained correspondence relationship between view identifiers and view components, and read an animation description that is to be implemented and corresponds to the animation identifier in the animation description script based on the animation identifier corresponding to the view identifier; and an animation loading unit configured to load the animation description to be implemented in the view component to be driven according to a condition provided by the logic script when the condition is met.

The present disclosure further provides an electronic device, which includes a display; a processor; and memory configured to store a program that implements an animation method in a client application, the device, after being powered and running the program that implements the animation method in the client application through the processor, executing the following operations: receiving an animation code written in a script language sent from a server, the animation code including a logic script and an animation description script; parsing the logic script in the animation code, and obtaining a view identifier, an animation identifier, and a correspondence relationship between the view identifier and the animation identifier included therein; determining a view component that is to be driven and corresponds to the view identifier in a client application based on a pre-obtained correspondence relationship between view identifiers and view components, and reading an animation description that is to be implemented and corresponds to the animation identifier in the animation description script based on the animation identifier corresponding to the view identifier; and loading the animation description to be implemented in the view component to be driven according to a condition provided by the logic script when the condition is met.

The methods for implementing animation in a client application provided by the present disclosure have the following advantages as compared to the existing technologies.

1. An application program of a client receives an animation script sent by a server, and the client does not need hard coding. Therefore, the client can adjust an animation code according to the animation code sent by the server at any time.

2. Since the animation script is sent from the server to the client at any time, an animation is triggered through code calling at the same time when a page of the application program is displayed, and a user can experience a new function in real time with a high coverage.

3. Implementation of animation effects only needs to write animation codes on the server and deliver thereof to the client, thus skipping processes of compilation, packaging, testing, and release. The cost of implementing animation is lower and a cycle thereof is shorter, thus being able to meet operational requirements.

DETAILED DESCRIPTION

A number of specific details are set forth in the following description below to facilitate a thorough understanding of the invention. However, the present disclosure can be implemented in many other ways that are different from those described herein, and one skilled in the art can make a similar promotion without departing from the scope of the present disclosure. Therefore, the present disclosure is not limited by the particular embodiments disclosed herein.

In implementations, a platform for implementing an animation script in a client application, a method for implementing animation in a client application, an apparatus for implementing animation in a client application, and an electronic device are provided respectively. Detailed descriptions thereof are made one by one in the following embodiments. For the ease of understanding, technical solutions provided by the embodiments of the present disclosure are briefly described.

In the existing technologies, a mobile APP is usually developed using a platform-specific language thereof. For example, an iOS system uses an OC language to develop an iOS APP, and Android uses JAVA language to develop an Android APP, but APPs developed by these languages do not possess dynamic capabilities. In other words, once an APP is developed and downloaded to a mobile phone of a user, the code logic in the APP can no longer be modified unless codes of the APP are updated and re-downloaded by the user.

In the method for implementing animation in a client application provided by the present disclosure, by accessing a framework for implementing an animation script in the client application in the client application, the client application can receive an animation script sent by a server. Since JavaScript is an interpreted script language that can be distributed to a mobile phone of a user at any time without prior compilation. This means that the code logic in an APP can be changed at any time to complete changes of the functional logic in the APP, without the need of the user to re-download the APP. Therefore, a client can adjust animation codes based on animation codes sent by the server at any time. Implementations of animation effects on the client side can be realized by writing animation codes on the server and delivering thereof to the client, thus skipping processes of compilation, packaging, testing, and release. The cost of implementing animation is lower, and a cycle thereof is short, thus being capable of meeting operational requirements.

Figure 1:
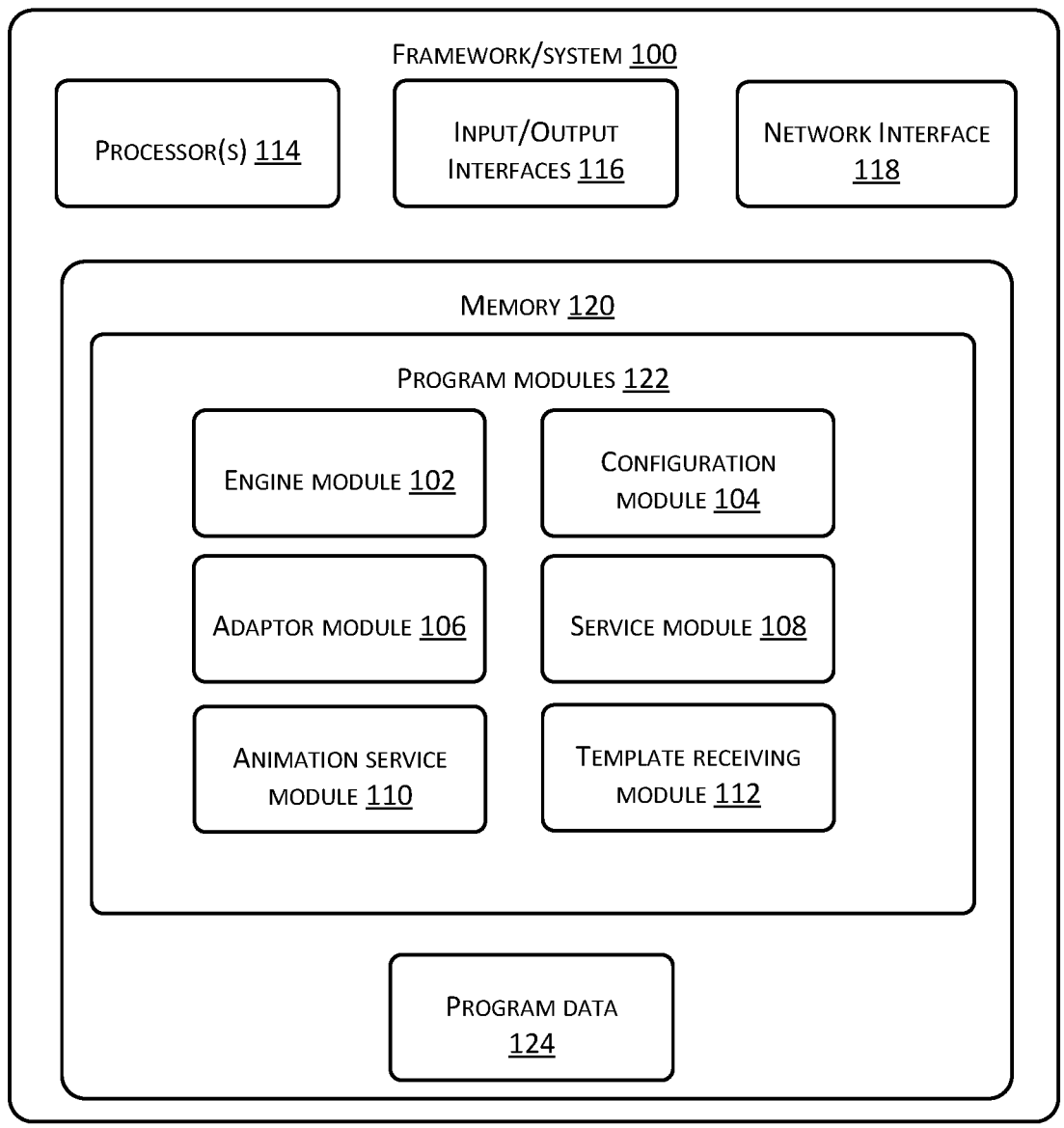
FIG. 1 is a schematic diagram of a framework implementing an animation script in a client application in accordance with a first embodiment of the present disclosure.

A first embodiment of the present disclosure provides a framework for implementing an animation script in a client application. Referring to FIG. 1, a schematic diagram of a framework or system for implementing an animation script in a client application according to the embodiments of the present disclosure is shown. The details will be described hereinafter in conjunction with FIG. 1. The framework or system 100 for implementing an animation script in a client application in the present embodiment may be referred to as a Flare framework. The Flare framework is positioned as a general-purpose framework that can be connected to any client platform (Taobao, Tmall, Juhuasuan, etc.). For obtaining configuration (module configuration information, a JS script file, an animation description file), Flare opens a universal adapter interface, implement interface definition methods for each client platform, and inject implementation classes at program startup or at a proper time. When the configuration is obtained at subsequent times, access modules directly call the interface.

The framework or system 100 for implementing an animation script in a client application includes an engine module 102, a configuration module 104, an adapter module 106, and a service module 108.

The engine module 102 is configured to provide an initialization of the framework, including implementing registration of an interface of a configuration center and implementing registration of an interface of a template center.

In implementations, the engine module 102 can be designed to include an engine class, providing a method for obtaining a configuration, implementing registration of an interface of a configuration center, and implementing registration of an interface of a template center, and is used for global initialization of the Flare framework.

The configuration refers to some parameters that control a running state and logic of a program.

Obtaining the configuration refers to the client application obtaining configuration data that is needed from the configuration center. When the service module needs to be configured, a corresponding configuration is obtained.

The configuration center refers to a backend platform used for managing the configuration, and can perform dynamic delivery of the configuration according to a client platform and a version.

The registration of the interface of the configuration center is specifically to create an implementation class for the framework and the interface of the configuration center, and implementing methods defined in the interface; and to implement an interface with the configuration center using these methods, so that the configuration can be read from the configuration center.

The template center refers to a backend platform that provides an animation template.

The registration of the interface of the template center refers to creating an implementation class for the framework and the interface of the template center, and implementing methods defined in the interface; and implementing an interface with the template center using these methods, so that an animation template can be obtained from the template center.

The configuration module 104 is configured to receive configuration data of the configuration center that the framework depends on, the configuration data providing information needed by the service module to access the framework.

The configuration data of the configuration center that the framework depends on includes whether an animation processing takes effect, a name of a script that is receivable by the client application, etc.

In implementations, the configuration module 104 can be designed to include a configuration class and a configuration interface.

1) Configuration Class

Open a unified interface for obtaining configuration for the configuration center. After an external registration is implemented by an engine (a Flare Engine), reading of data of the configuration center that the framework depends on is achieved through this interface. Moreover, configuration data that has been parsed is provided to the framework.

2) Configuration interface

Flare is a generalized framework which does not bind to a fixed configuration center, and opens a unified adaptation interface. By implementing this interface and an injection method, the problem of differences among configuration centers accessing a platform is solved. Specifically, according to different client applications or client environments, corresponding configuration interfaces are set, so that a Flare platform in different environments can obtain configurations from configuration centers.

The adapter module 106 is configured to provide a universal adaptation interface to different application modules, provide an interface related to execution of an animation script to an application module, and provide an interface to implement driving of animation in the application module.

The different application modules include mobile Taobao, mobile Tmall, Juhuasuan, and the like.

The adapter is a main access method of the Flare framework. The service module can complete a creation of JS services and animation services through the adapter, and complete triggering of the animation, communications of information of a JS environment and an Native environment through an open interface.

The adapter module 108 includes an adapter class, an adapter management class, and an adapter interface layer.

1) Adapter Class

The Flare framework can interface with service modules (transaction links, search, shopping guides, etc.) or with frameworks (Tangram layout frameworks, etc.) at a code level. The way of interfacing is an adapter method. An adapter class provides methods such as component lookup, mapping lookup, and animation triggering, etc., and provides thereof to an accessing party. The accessing party refers to each service module.

2) Adapter Management Class

A service module can manage adapters thereof, or host the adapters to an adapter management class. The adapter management class can create or destroy adapter instances and control a lifecycle of an adapter.

3) Adapter Interface Layer

Used for providing various interfaces to service modules, and animation can be implemented in the service modules through these interfaces.

The service module 108 is configured to provide a running environment of a script language, and receive loading and running of a script program.

After loading of a script program is received, the service module 108 performs the following processing: parsing a logic script in an animation code, and obtaining a view identifier and an animation identifier, parsing a logic script in an animation code, obtaining a view identifier, an animation identifier, and a correspondence relationship between the view identifier and the animation identifier included therein; determining a view component that is to be driven and corresponds to the view identifier in the client application based on a pre-acquired correspondence relationship between the view identifier and the view component, and reading an animation description that is to be implemented and corresponds to the animation identifier in an animation description script based on the animation identifier corresponding to the view identifier; and loading the animation description to be implemented into the view component to be driven in the client application through an interface provided by the adapter module based on a condition provided by the logic script when the condition is met.

The service module 108 includes a JS service module.

The JS service module can be designed to include a JS object, a JS service class, and a JS service interface layer.

The JS object is configured to provide a registered JS environment object, a log, and an animation trigger function.

The JS service class is configured to provide functions of managing the JS object and a JS environment context, and receiving information from a JS environment.

The JS service interface layer is configured to classify an interface to the Native end opened by JS and a method of callback of the JS object.

The framework or system 100 also includes an animation service module 110 configured to provide an animation parsing function and store parsed animation description data.

The animation service module 110 can be designed to include an animation parsing class, an animation library, an animation service class, and the like.

The animation parsing class is configured to parse an animation description script into animation description data.

The animation library is configured to cache the parsed animation description data.

The animation service class is configured to provide an animation lookup function.

The framework or system 100 further includes a template receiving module 112 configured to receive an animation template provided by the template center, and the animation template provided by the template center is used when the service module runs the script program.

In implementations, framework or system 100 may also include one or more processors 114, an input/output (I/O) interface 116, a network interface 118, and memory 120.

The memory 120 may include a form of computer readable media such as a volatile memory, a random access memory (RAM) and/or a non-volatile memory, for example, a read-only memory (ROM) or a flash RAM. The memory 120 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 120 may include program modules 122 and program data 124. The program modules 122 may include one or more of the modules described in the foregoing description and FIG. 1.

Figure 2:
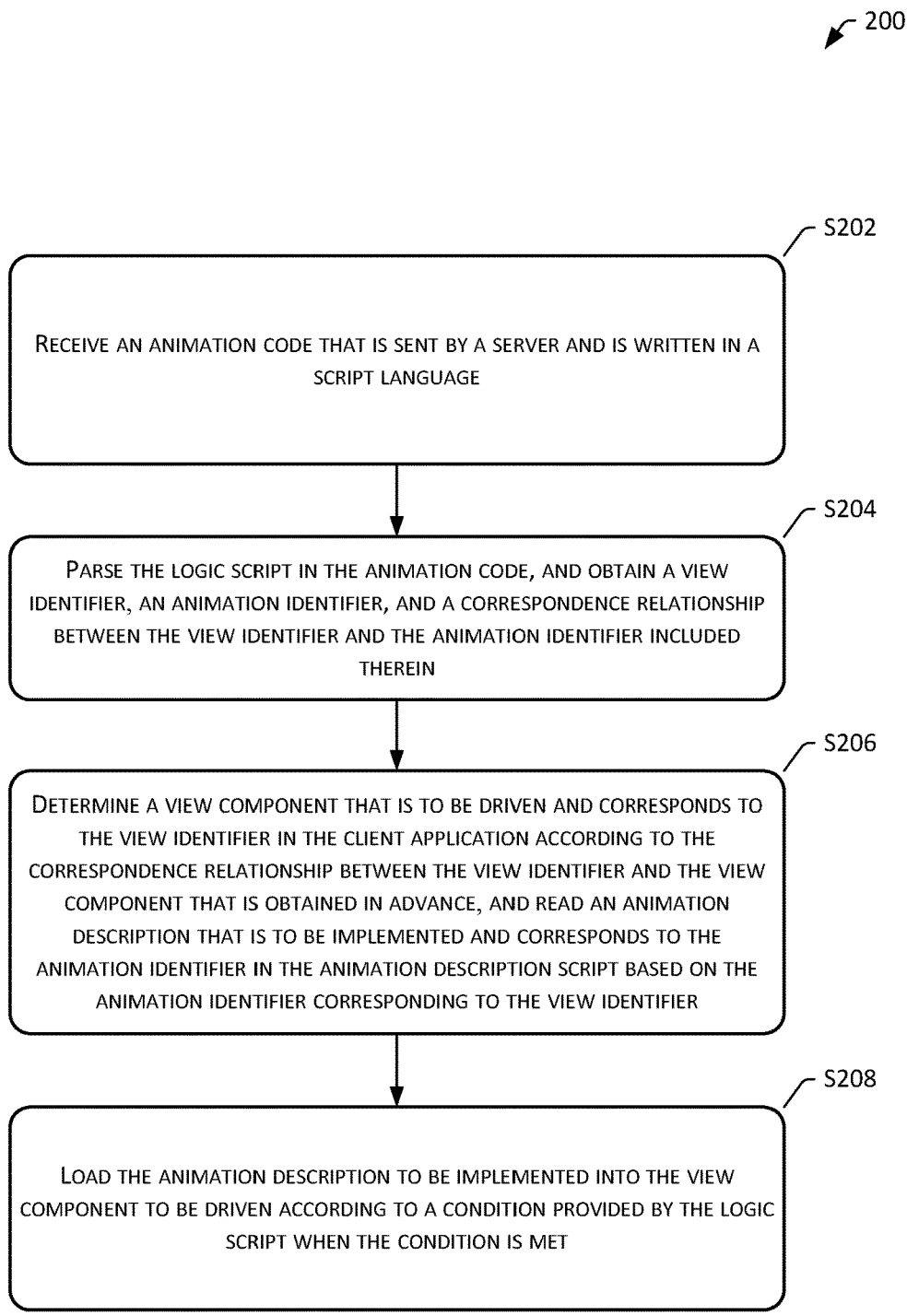
FIG. 2 is a flowchart of a method implementing an animation in a client application in accordance with a second embodiment of the present disclosure.
Figure 3:
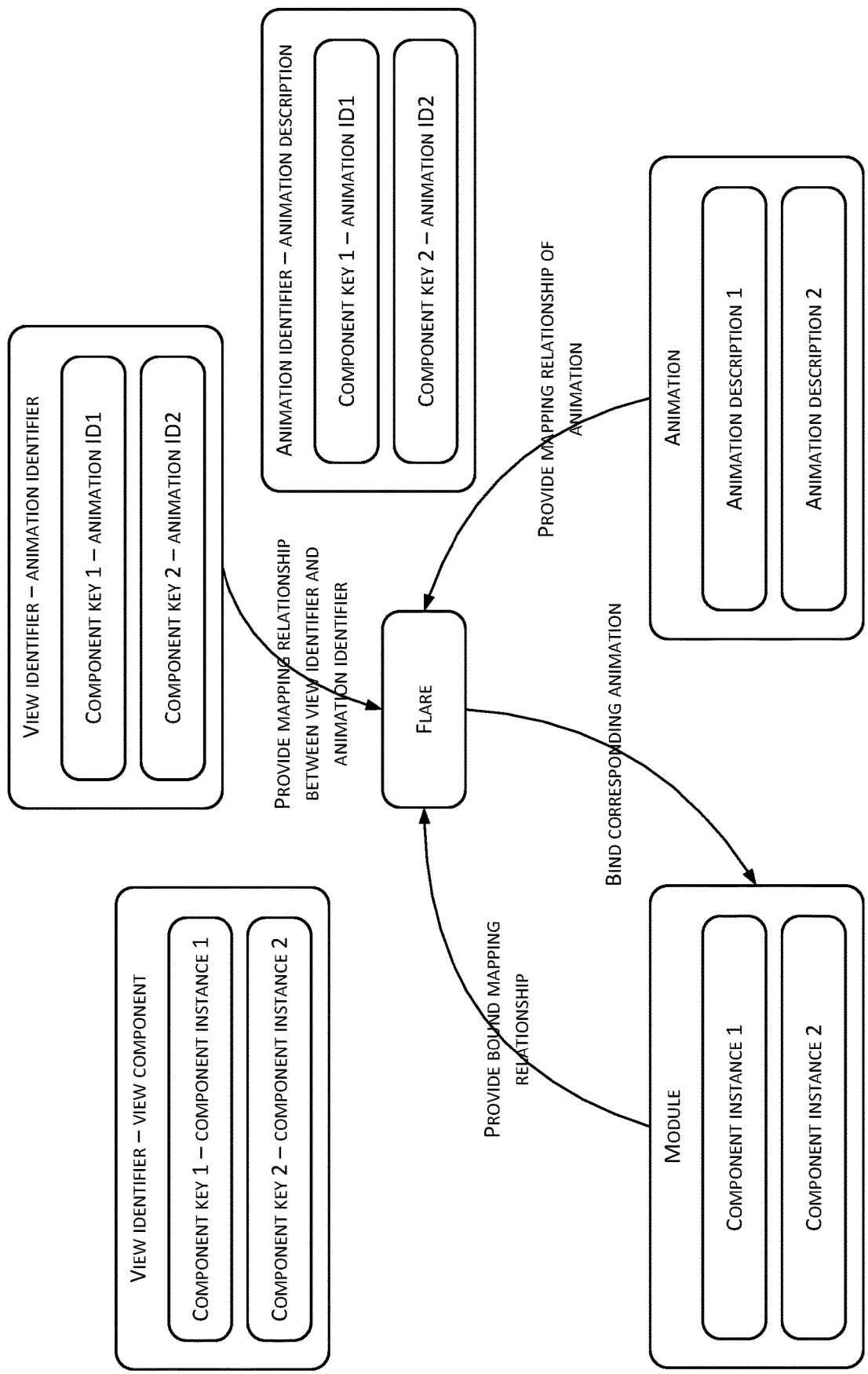
FIG. 3 is a schematic diagram of loading an animation into a view component in accordance with the second embodiment of the present disclosure.

A second embodiment of the present disclosure provides a method of implementing animation in a client application. Referring to FIG. 2, a flowchart of a method 200 for implementing animation in a client application according to an embodiment of the present disclosure is shown. FIG. 3 is a schematic diagram of loading an animation into a view component provided by the second embodiment of the present disclosure. The details are described hereinafter with reference to FIGS. 2 and 3. This embodiment provides a method for implementing animation in a client application from the perspective of a client, i.e., executing the method provided by this embodiment is a client.

Operation S202: Receive an animation code that is sent by a server and is written in a script language, the animation code including a logic script and a script of animation description.

In this operation, a client receives an animation code sent by a server, which provides preconditions for implementing animation on the client.

The animation is a set of attributes that describe view changes, such as transparency, displacement, scale, etc.

The animation description refers to describing an action of the animation, and an object described by the animation may be a single animation or a combined animation.

The animation logic generally refers to control logic related to services, including a timing of triggering control of the animation, and control logic of a lifecycle of the animation. The lifecycle of the animation includes creation, pause and recycle of the animation, and callbacks of start of execution and end of execution of the animation.

The script is pieces of text commands, which can be seen (such as can be opened and edited using a notepad). When the script is executed, an interpreter of a system translates the pieces of text commands into machine-recognizable instructions, and executes the machine-recognizable instructions according to a program order. Since the script has an additional translation process when being executed, the script is slightly less efficient than a binary program. Scripts can usually be temporarily called and executed by an application program. Various scripts are widely used in web design because the scripts can not only reduce sizes of web pages and increase the speed of web browsing, but also enrich the performance of the web pages, such as animations and sounds.

The script of animation description refers to a script including animation description content, and the animation description content is written into an animation description script using a script description language. The animation description script is sent from the server to the client. In the present embodiment, the animation description script is sent from the server to the client (for example, Tmall APP), and the animation description script can describe animation using JSON. Animations described in the JSON language are concatenated through JS scripts.

In a specific implementation, the animation description script can be described in a manner of Key-Value, i.e., abstracted into a JSON format. For example, a certain animation is described in an animation description script as:

```
{
"module": "TMMarket",
"items": "tv_anim",
"repeatCount":3,
"autoreverses":YES,
"motions":[{
"name": "1",
"duration":100,
......
}]
}
``` where module—a name of a component instance, repeatCount—the number of repetitions;

autoreverses—run animation in a reverse order; name—an animation identifier; duration—the time taken for the animation to complete a cycle.

The logic script refers to abstracting animation logic into a JS script, and controlling a timing of triggering and a form of presentation, etc., of the animation through a running environment of JS. When an assessing party is initialized, a corresponding JS script is synchronously initialized. By abstraction through some methods and communications between JS and Native, a portion of main service logic controls can be completed, and scripting is completed.

JS (JavaScript) is a script language with logical computing and executable capabilities, and possesses dynamic, cross-platform and flexible characteristics as compared to OC (iOS), Java (Android), C# (Windows Phone) and other languages used in client development. Scenes that are mostly used are on a web browser, and JavaScript is currently used on almost all web pages.

The animation description script and the logic script are located on the server, and the server can modify the animation description script and the logic script at will, and can complete a dynamic release of the animation description script and the logic script by combining with the capabilities provided by the client configuration center, the template center and the like. Thus, the client can complete animation actions and logic changes under different versions, so that product requirements can be quickly responded.

Receiving the animation code that is written in the script language and sent by the server refers to an application program of a client having a graphical interface receiving the animation description script and the logic script sent by the server. Since the animation description script and the logic script exist on the server, the animation description script and the logic script need to be sent to the application program of the client for the client to display the animation.

For example, an icon of an entrance of a Tmall supermarket in a homepage of a Tmall APP needs to make an enlarged animation effect every three seconds to highlight the Tmall supermarket, but the code logic of this animation effect is not implemented in the APP. In the case, an animation description script and a logic script related to the icon of the entrance of the Tmall supermarket can first be written in a server of the Tmall APP, and the animation description script and the logic script are sent from the server to the Tmall APP. A client receives the sent animation description script and animation logic script, and stores them in the Tmall APP.

An application program of the client needs to receive configuration data sent from a configuration center before receiving an animation code written in a script language from the server. The configuration center refers to a backend platform for managing configuration, and can perform dynamic delivery of the configuration according to a client platform and a version.

The configuration data delivered from the configuration center includes configuration about whether an animation processing takes effect, a name of a script that is receivable by the client application, and the like. An application program of the client determines whether the animation processing takes effect based on the configuration data received from the configuration center. For example, when a configuration parameter related to the effectiveness of the animation processing effective is set to 1, the animation processing takes effect. When the configuration parameter related to the effectiveness of the animation processing is set to 0, the animation processing does not take effect. The client application receives an animation code sent by the server only when the animation processing takes effect. The client application receives a corresponding animation description script and a corresponding logic script from the server according to names of scripts sent from the configuration center.

Operation S204: Parse the logic script in the animation code, and obtain a view identifier, an animation identifier, and a correspondence relationship between the view identifier and the animation identifier included therein.

The view identifier (component key) is a unique key for identifying a view (a component instance). A service module needs to provide such mapping relationship. An animation engine (a Flare engine in the present embodiment) finds a corresponding view through the view identifier, and bind an animation to the corresponding view.

The animation identifier (animation ID) is a unique key that identifies an animation. The animation engine parses all animation description scripts or fragments. When an animation needs to be triggered, a corresponding animation description can be found according to an animation identifier to generate the animation.

Parsing the logic script in the animation code can obtain a view identifier, an animation identifier, and a correspondence relationship between the view identifier and the animation identifier included therein.

The above mapping relationship can be defined on the Native side (the end in which the code is written using the programming language of a client system) or in the JS environment. When a mapping relationship is obtained, sources of the mapping relationship are of multiple types, and an adapter preferentially obtains the mapping relationship from the JS environment.

Operation S206: Determine a view component that is to be driven and corresponds to the view identifier in the client application according to the correspondence relationship between the view identifier and the view component that is obtained in advance, and read an animation description that is to be implemented and corresponds to the animation identifier in the animation description script based on the animation identifier corresponding to the view identifier.

The component refers to an element on a page, such as a registration form, a button, a tab, and the like.

The view component refers to a component that stores a view on a page. Each view component corresponds to a view instance. For example, a view component can be an icon for a portal of a Tmall supermarket or different views dynamically displayed and scrolled at a same location on a Tmall homepage.

The view component to be driven refers to a target view component that is to be loaded for implementing an animation description.

The pre-obtained correspondence relationship between the view identifier and the view component can be acquired synchronously from an application program.

The animation description refers to animation description data parsed from the animation description script, and the animation description data may be stored in a form of a collection of Map types. A Map collection class is used for storing element pairs (called "key" and "value"), where each key is mapped to a value. In the present embodiment, the animation description data can be stored in an animation library of a Flare framework. For example, the animation library stores an animation description 1, an animation description 2 and an animation description 3, which respectively correspond to an animation identification ID1, an animation identification ID2 and an animation identification ID3, with the animation descriptions 1, 2 and 3 as "value", and the animation identifications ID1, ID2, ID3 as "key". A corresponding "value" can be found based on a "key".

The animation description that is to be implemented and corresponds to the animation identifier refers to an animation description corresponding to the animation identifier. For example, the animation description that is to be implemented and corresponds to the animation identifier ID1 is the animation description 1.

Reading the animation description that is to be implemented and corresponds to the view identifier in the animation script based on the animation identifier corresponding to the view identifier refers to an animation engine in a platform that implements the animation script in the client application reading the animation description that is to be implemented and corresponds to the animation identifier in the animation script based on the animation identifier corresponding to the view identifier. Still following the example at operation S202, the Flare engine in the Tmall APP parses the animation description script into the animation description data, and stores the animation description data in the animation library in the Flare framework. If the animation identifier of the icon of the entrance of the Tmall supermarket that is stored in the animation library is ID1, the corresponding animation description to be implemented is the animation description 1.

Operation S208: Load the animation description to be implemented into the view component to be driven according to a condition provided by the logic script when the condition is met.

The animation description to be implemented and the view component to be driven are obtained through operation S206. When the logic script is executed, an animation is triggered, and the animation description to be implemented is loaded into the view component to be driven to implement animation.

Corresponding to the above-mentioned method for implementing animation in a client application, the embodiments of the present disclosure further provide an apparatus for implementing animation in a client application. Since the apparatus embodiment is substantially similar to the method embodiment, the description thereof is relatively simple, and relevant parts can be referenced to the description of the method embodiment. The apparatus embodiments described hereinafter are merely illustrative. The embodiment of the apparatus for implementing animation in a client application is as follows.

Figure 4:
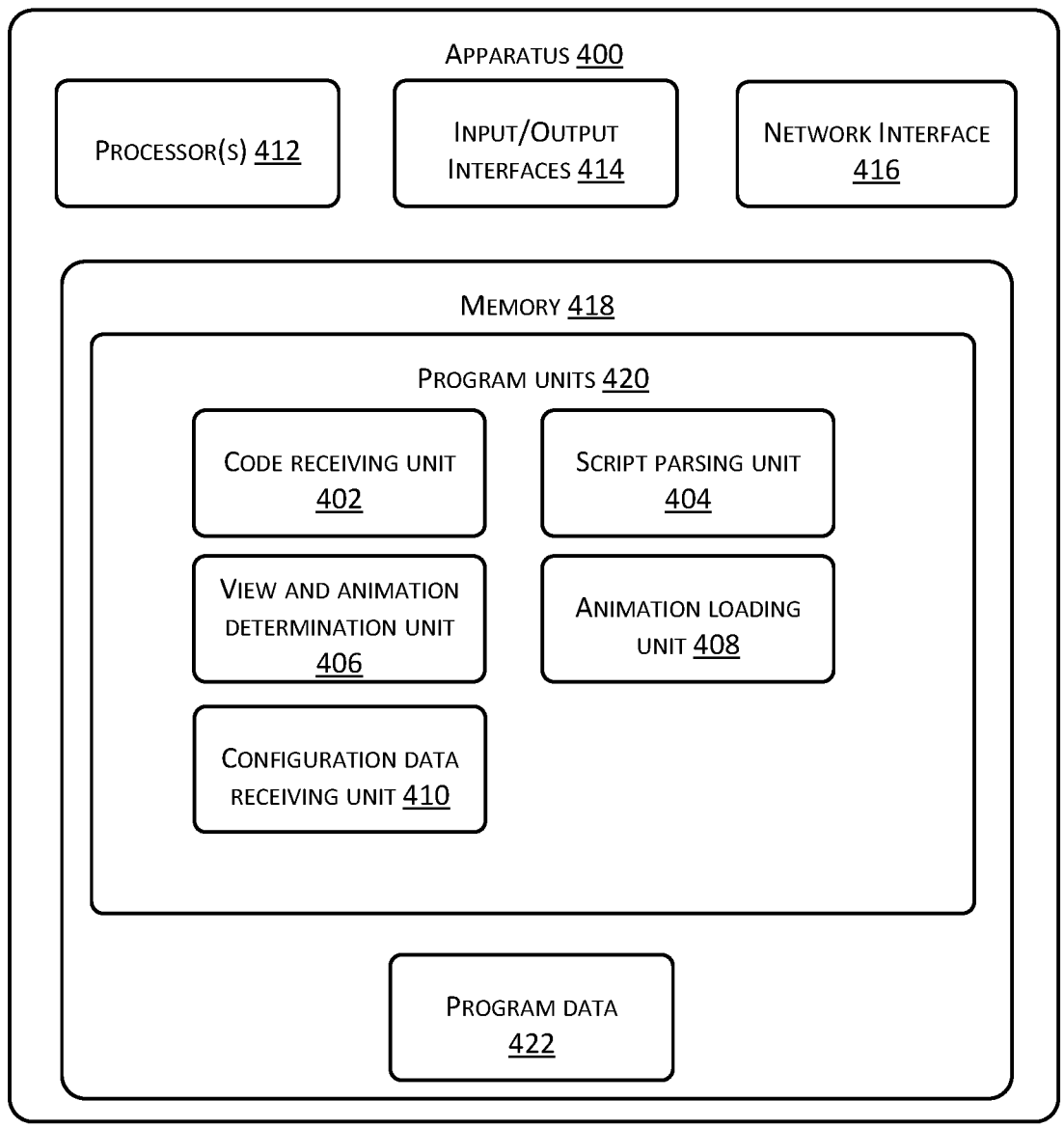
FIG. 4 is a schematic diagram of an apparatus implementing an animation in a client application in accordance with a third embodiment of the present disclosure.

Referring to FIG. 4, a schematic diagram of an apparatus 400 for implementing animation in a client application in accordance with a third embodiment of the present disclosure is shown. In implementations, the apparatus 400 may include one or more computing devices. In implementations, the apparatus 400 may be a part of one or more computing devices, e.g., implemented or run by the one or more computing devices. In implementations, the one or more computing devices may be located in a single place or distributed among a plurality of network devices over a network. In a typical configuration, a computing device includes one or more processors (CPU), an input/output interface, a network interface, and memory.

In implementations, the apparatus 400 for implementing animation in a client application includes a code receiving unit 402, a script parsing unit 404, a view and animation determination unit 406, and an animation loading unit 408.

The code receiving unit 402 is configured to receive an animation code written in a script language sent from a server, the animation code including a logic script and an animation description script.

The script parsing unit 404 is configured to parse the logic script in the animation code, and obtain a view identifier, an animation identifier, and a correspondence relationship between the view identifier and the animation identifier included therein.

The view and animation determination unit 406 is configured to determine a view component that is to be driven and corresponds to the view identifier in a client application based on a pre-obtained correspondence relationship between view identifiers and view components, and read an animation description that is to be implemented and corresponds to the animation identifier in the animation description script based on the animation identifier corresponding to the view identifier.

The animation loading unit 408 is configured to load the animation description to be implemented in the view component to be driven according to a condition provided by the logic script when the condition is met.

Optionally, the apparatus 400 includes a configuration data receiving unit 410 configured to receive configuration data sent from a configuration center prior to the code receiving unit, the configuration data including at least whether a configuration of animation processing takes effect, and a name of a script that is receivable by the client application.

Optionally, a logic function of the logic script includes animation triggering, executing, pausing, and recycling.

Optionally, the animation description script uses a JSON language for animation description.

Optionally, the pre-obtained correspondence relationship between the view identifier and the view component is obtained synchronously from an application program.

In implementations, the apparatus 400 may also include one or more processors 412, an input/output (I/O) interface 414, a network interface 416, and memory 418.

The memory 418 may include a form of computer readable media such as a volatile memory, a random access memory (RAM) and/or a non-volatile memory, for example, a read-only memory (ROM) or a flash RAM. The memory 418 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 418 may include program units 420 and program data 422. The program units 420 may include one or more of the units described in the foregoing description and FIG. 4.

A fourth embodiment of the present disclosure provides an electronic device. The electronic device includes a display; a processor; and memory configured to store a program that implements an animation method in a client application, the device, after being powered and running the program that implements the animation method in the client application through the processor, executing the following operations: receiving an animation code written in a script language sent from a server, the animation code including a logic script and an animation description script; parsing the logic script in the animation code, and obtaining a view identifier, an animation identifier, and a correspondence relationship between the view identifier and the animation identifier included therein; determining a view component that is to be driven and corresponds to the view identifier in a client application based on a pre-obtained correspondence relationship between view identifiers and view components, and reading an animation description that is to be implemented and corresponds to the animation identifier in the animation description script based on the animation identifier corresponding to the view identifier; and loading the animation description to be implemented in the view component to be driven according to a condition provided by the logic script when the condition is met.

Although the present disclosure is disclosed using the above preferred embodiments, the above preferred embodiments are not intended to limit the invention. One skilled in the art can make possible variations and modifications without departing from the spirit and scope of the invention. Therefore, the scope of protection ought to be determined by the scope defined by the claims of the present disclosure.

One skilled in the art should understand that the embodiments of the present disclosure can be provided as a method, a system, or a computer program product. Thus, the present disclosure can take a form of an entirely hardware embodiment, an entirely software embodiment or an embodiment of a combination of software and hardware. Moreover, the present disclosure can take a form of a computer program product embodied on one or more computer-usable storage media (including, but not limited to, a magnetic storage device, CD-ROM, an optical storage device, etc.) including computer usable program codes.

The present disclosure can be further understood using the following clauses.

Clause 1: A method for implementing animation in a client application, comprising: receiving an animation code written in a script language sent from a server, the animation code including a logic script and an animation description script; parsing the logic script in the animation code, and obtaining a view identifier, an animation identifier, and a correspondence relationship between the view identifier and the animation identifier included therein; determining a view component to be driven that corresponds to the view identifier in a client application based on a pre-obtained correspondence relationship between view identifiers and view components, and reading an animation description to be implemented that corresponds to the animation identifier in the animation description script according to the animation identifier corresponding to the view identifier; and determining that loading of the animation description to be implemented in the view component to be driven according to a condition provided by the logic script.

Clause 2: The method according to Clause 1, wherein before receiving the animation code written in the script language sent from the server, the method comprises receiving configuration data sent from a configuration center, the configuration data comprising at least configuring whether a configuration of animation processing takes effect, and a name of a script that is receivable by the client application.

Clause 3: The method according to Clause 1, wherein a logic function of the logic script includes animation triggering, executing, pausing, and recycling.

Clause 4: The method according to Clause 1, wherein the animation description script is animated in a JSON language.

Clause 5: The method according to Clause 1, wherein the pre-obtained correspondence relationship between the view identifiers and the view components is obtained synchronously from an application program.

Clause 6: A framework for implementing an animation script in a client application comprising an engine module, a configuration module, an adapter module, and a service module, wherein: the engine module is configured to provide initialization of a framework, including implementing registration of an interface of a configuration center and implementing registration of an interface of a template center; the configuration module is configured to receive configuration data of the configuration center that the framework depends on, the configuration data providing information needed for the framework to access the service module; the adapter module is configured to provide a universal adaptation interface to different application modules, provide an interface related to an execution of an animation script to the application modules, and provide an animation-driven interface in the application modules; and the service module is configured to provide a running environment of a script language, and receive and load a script program.

Clause 7: The framework according to Clause 6, wherein the configuration data of the configuration center that the framework depends on includes whether a configuration of animation processing takes effect and a name of a script that is receivable by the client application.

Clause 8: The framework according to Clause 6, wherein the different application modules include mobile Taobao, mobile Tmall, and Juhuasuan.

Clause 9: The framework according to Clause 6, wherein the framework further comprises an animation service module configured to provide an animation parsing function and store parsed animation description data.

Clause 10: The framework according to Clause 9, wherein the framework further comprises a template receiving module configured to receive an animation template provided by the template center, wherein the animation template provided by the template center is used when the service module runs the script program.

Clause 11: The framework according to Clause 6, wherein after receiving the loading of the script program, the service module performs the following processing: parsing a logic script in an animation code, obtaining a view identifier, an animation identifier, and a correspondence relationship between the view identifier and the animation identifier included therein; determining a view component that is to be driven and corresponds to the view identifier in the client application based on a pre-acquired correspondence relationship between the view identifier and the view component, and reading an animation description that is to be implemented and corresponds to the animation identifier in an animation description script based on the animation identifier corresponding to the view identifier; and loading the animation description to be implemented into the view component to be driven in the client application through an interface provided by the adapter module based on a condition provided by the logic script when the condition is met.

Clause 12: An apparatus for implementing animation in a client application comprising: a code receiving unit configured to receive an animation code written in a script language sent from a server, the animation code including a logic script and an animation description script; a script parsing unit configured to parse the logic script in the animation code, and obtain a view identifier, an animation identifier, and a correspondence relationship between the view identifier and the animation identifier included therein; a view and animation determination unit configured to determine a view component that is to be driven and corresponds to the view identifier in a client application based on a pre-obtained correspondence relationship between view identifiers and view components, and read an animation description that is to be implemented and corresponds to the animation identifier in the animation description script based on the animation identifier corresponding to the view identifier; and an animation loading unit configured to load the animation description to be implemented in the view component to be driven according to a condition provided by the logic script when the condition is met.

Clause 13: An electronic device comprising: a display; a processor; and memory configured to store a program that implements an animation method in a client application, wherein the device, after being powered and running the program that implements the animation method in the client application through the processor, executes the following operations: receiving an animation code written in a script language sent from a server, the animation code including a logic script and an animation description script; parsing the logic script in the animation code, and obtaining a view identifier, an animation identifier, and a correspondence relationship between the view identifier and the animation identifier included therein; determining a view component that is to be driven and corresponds to the view identifier in a client application based on a pre-obtained correspondence relationship between view identifiers and view components, and reading an animation description that is to be implemented and corresponds to the animation identifier in the animation description script based on the animation identifier corresponding to the view identifier; and loading the animation description to be implemented in the view component to be driven according to a condition provided by the logic script when the condition is met.

What is claimed is:

1. A method implemented by one or more computing devices, the method comprising:
   receiving, by a client application in the one or more computing devices, an animation code written in a script language sent from a server, the animation code including a logic script and an animation description script;
   parsing the logic script in the animation code, and obtaining a view identifier and an animation identifier;
   obtaining a mapping relationship between the view identifier and the animation identifier;
   determining, by the client application, a view component to be driven that corresponds to the view identifier in the client application;
   reading an animation description to be implemented that corresponds to the animation identifier in the animation description script according to the animation identifier corresponding to the view identifier based on the mapping relationship;
   binding the animation description and the view component, and providing a bound mapping relationship between the animation description and the view component; and
   loading the animation description to be implemented in the view component to be driven based on the bound mapping relationship and according to a condition provided by the logic script.

2. The method according to claim 1, further comprising receiving, by the client application, configuration data sent from a configuration center before receiving the animation code written in the script language sent from the server.

3. The method according to claim 2, wherein the configuration data comprises at least one of whether a configuration of animation processing takes effect, or a name of a script that is receivable by the client application.

4. The method according to claim 1, wherein a logic function of the logic script comprises animation triggering, executing, pausing, and recycling.

5. The method according to claim 1, wherein the animation description script is animated in a JSON language.

6. The method according to claim 1, wherein determining, by the client application, the view component to be driven that corresponds to the view identifier in the client application is based on a pre-obtained correspondence relationship between view identifiers and view components.

7. The method according to claim 6, wherein the pre-obtained correspondence relationship between the view identifiers and the view components is obtained synchronously from an application program.

8. One or more computer readable media storing executable instructions including a client application that, when executed by one or more processors, cause the one or more processors to perform acts comprising:
receiving, by the client application, an animation code written in a script language sent from a server, the animation code including a logic script and an animation description script;
parsing the logic script in the animation code, and obtaining a view identifier, an animation identifier;
obtaining a mapping relationship between the view identifier and the animation identifier;
determining, by the client application, a view component to be driven that corresponds to the view identifier in the client application;
reading an animation description to be implemented that corresponds to the animation identifier in the animation description script according to the animation identifier corresponding to the view identifier based on the mapping relationship;
binding the animation description and the view component and providing a bound mapping relationship between the animation description and the view component; and
loading the animation description to be implemented in the view component to be driven based on the bound mapping relationship and according to a condition provided by the logic script.

9. The one or more computer readable media according to claim 8, the acts further comprising receiving, by the client application, configuration data sent from a configuration center before receiving the animation code written in the script language sent from the server.

10. The one or more computer readable media according to claim 9, wherein the configuration data comprises at least one of whether a configuration of animation processing takes effect, or a name of a script that is receivable by the client application.

11. The one or more computer readable media according to claim 8, wherein a logic function of the logic script comprises animation triggering, executing, pausing, and recycling.

12. The one or more computer readable media according to claim 8, wherein the animation description script is animated in a JSON language.

13. The one or more computer readable media according to claim 8, wherein determining, by the client application, the view component to be driven that corresponds to the view identifier in the client application is based on a pre-obtained correspondence relationship between view identifiers and view components.

14. The one or more computer readable media according to claim 13, wherein the pre-obtained correspondence relationship between the view identifiers and the view components is obtained synchronously from an application program.

15. A system comprising:
one or more processors; and
memory coupled to the one or more processors, the memory storing a plurality of executable units (units) by the one or more processors, that when executed by the one or more processors, perform associated functions in a client application, the units including:
a code receiving unit configured to receive an animation code written in a script language sent from a server, the animation code including a logic script and an animation description script,
a scrip parsing unit configured to:
parse the logic script in the animation code,
obtain a view identifier and an animation identifier, and
obtain a mapping relationship between the view identifier and the animation identifier,
a view and animation determination unit configured to:
determine a view component to be driven that corresponds to the view identifier in the client application,
read an animation description to be implemented that corresponds to the animation identifier in the animation description script according to the animation identifier corresponding to the view identifier based on the mapping relationship, and
bind the animation description and the view component, and provide a bound mapping relationship between the animation description and the view component, and
an animation loading unit configured to load the animation description to be implemented in the view component to be driven based on the bound mapping relationship and according to a condition provided by the logic script.

16. The system according to claim 15, wherein the units further comprise:
a configuration data receiving unit configured to receive configuration data sent from a configuration center before receiving the animation code written in the script language sent from the server.

17. The system according to claim 16, wherein the configuration data comprises at least one of whether a configuration of animation processing takes effect, or a name of a script that is receivable by the client application.

18. The system according to claim 15, wherein a logic function of the logic script comprises animation triggering, executing, pausing, and recycling.

19. The system according to claim 15, wherein the animation description script is animated in a JSON language.

20. The system according to claim 15, wherein determining the view component to be driven that corresponds to the view identifier in the client application is based on a pre-obtained correspondence relationship between view identifiers and view components.

* * * * *